(12) United States Patent  
Fornos et al.

(10) Patent No.: US 12,138,862 B2
(45) Date of Patent: Nov. 12, 2024

(54) MATERIAL PROCESSING UNIT FOR 3D PRINTED PARTS

(71) Applicant: HEWLETT-PACKARD DEVELOPMENT COMPANY, L.P., Houston, TX (US)

(72) Inventors: Pol Fornos, Sant Cugat del Valles (ES); Sergio Puigardeu Aramendia, Corvallis, OR (US); Carmen Blasco, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 865 days.

(21) Appl. No.: 16/096,233

(22) PCT Filed: Jul. 12, 2016

(86) PCT No.: PCT/EP2016/066554
§ 371 (c)(1),
(2) Date: Oct. 24, 2018

(87) PCT Pub. No.: WO2018/010771
PCT Pub. Date: Jan. 18, 2018

(65) Prior Publication Data
US 2019/0118477 A1    Apr. 25, 2019

(51) Int. Cl.
*B29C 64/35*   (2017.01)
*B29C 64/153*   (2017.01)
(Continued)

(52) U.S. Cl.
CPC ............ *B29C 64/35* (2017.08); *B29C 64/153* (2017.08); *B29C 64/386* (2017.08); *B29C 64/393* (2017.08); *B33Y 10/00* (2014.12); *B33Y 30/00* (2014.12); *B33Y 40/00* (2014.12); *B33Y 50/02* (2014.12); *B29C 64/165* (2017.08)

(58) Field of Classification Search
None
See application file for complete search history.

(56) References Cited

U.S. PATENT DOCUMENTS 8,747,097 B2   6/2014   Pettis
9,280,616 B2   3/2016   Cudak et al.
(Continued)

FOREIGN PATENT DOCUMENTS

CN   104494147   4/2015
DE   102011075748   11/2012

OTHER PUBLICATIONS

Willis, K.D.; "Infrastructs: Fabricating Information Inside Physical Objects for Imaging in the Terahertz Region"; retrieved from the internet Oct. 24, 2018; http://www.karlddwillis.com/wp/wp-content/uploads/2011/03/SIGGRAPH2013-InfraStructs.pdf.

*Primary Examiner* — Mohammad M Ameen
(74) *Attorney, Agent, or Firm* — Shook, Hardy & Bacon L.L.P.

(57) ABSTRACT

According to one aspect, there is provided an apparatus and a method for extracting 3D printed parts from a build unit (114) in cleaning station comprising obtaining data representing the contents of a print job contained in the build unit (114) and generating a visualization of the contents of the build unit (114) based in part on the obtained data and in part on data related to operations performed by the cleaning station.

19 Claims, 9 Drawing Sheets

(51) Int. Cl.
*B29C 64/386* (2017.01)
*B29C 64/393* (2017.01)
*B33Y 10/00* (2015.01)
*B33Y 30/00* (2015.01)
*B33Y 40/00* (2020.01)
*B33Y 50/02* (2015.01)
*B29C 64/165* (2017.01)

(56) References Cited

U.S. PATENT DOCUMENTS

| | | | |
|---|---|---|---|
| 2007/0179656 A1* | 8/2007 | Eshed | B29C 64/135 |
| | | | 700/119 |
| 2015/0001750 A1 | 1/2015 | Kozlak et al. | |
| 2015/0248678 A1 | 9/2015 | Wee et al. | |
| 2015/0269290 A1* | 9/2015 | Nelaturi | G06T 17/10 |
| | | | 703/6 |
| 2015/0367415 A1* | 12/2015 | Buller | B33Y 10/00 |
| | | | 419/53 |
| 2016/0067927 A1 | 3/2016 | Voris et al. | |
| 2016/0114534 A1* | 4/2016 | Li | B29C 64/112 |
| | | | 264/40.1 |
| 2016/0311174 A1* | 10/2016 | Foley | B29C 64/35 |
| 2017/0136702 A1* | 5/2017 | Giulietti | G05B 19/401 |

\* cited by examiner

MATERIAL PROCESSING UNIT FOR 3D PRINTED PARTS

BACKGROUND

Additive manufacturing, more generally known as 3D printing, enables 3D objects to be built layer-by-layer based on a 3D object model of the object or objects to be built. Many different types of 3D printing techniques exist. One type of 3D printing involves forming successive layers of a build material, such as powdered build material, and selectively solidifying portions of each layer of build material to form each layer of the object or objects being generated. Generation of 3D objects may take place in a housing such as a build unit.

BRIEF DESCRIPTION

Examples will now be described, by way of non-limiting example only, with reference to the accompanying drawings, in which.

DETAILED DESCRIPTION

As mentioned above, one type of 3D printing involves forming successive layers of a build material, such as powdered build material, and selectively solidifying portions of each layer of build material to form each layer of the object or objects being generated. The layers of build material may be formed within a build unit on a moveable support platform that is lowered to enable each layer of build material to be formed thereon and selectively solidified. After processing of a 3D print job, the build unit contains a volume of solidified and unsolidified build material, supported on the support platform. The generated objects generally are formed of solidified build material, although in some cases portions of solidified build material may be generated during processing of a 3D print job which do not form part of the 3D objects being generated (such portions may include so-called sacrificial portions or portions used, for example, to provide specific thermal characteristics as an object or objects are generated). The generated objects have to be removed from the unsolidified build material, generally through a manual or semi-automated process.

Build material is typically opaque in nature, meaning that after a print job has been performed, generated objects formed within a build unit are hidden from view by unsolidified build material. Accordingly, recovery of specific generated objects within a build unit is generally difficult, especially where an operator of a material processing unit in which a build unit is processed after a 3D print job has been performed therein has no knowledge of the nature of the generated objects generated within the build unit. This difficulty may be further exasperated in 3D printing environments that use multiple build units.

Figure 1:
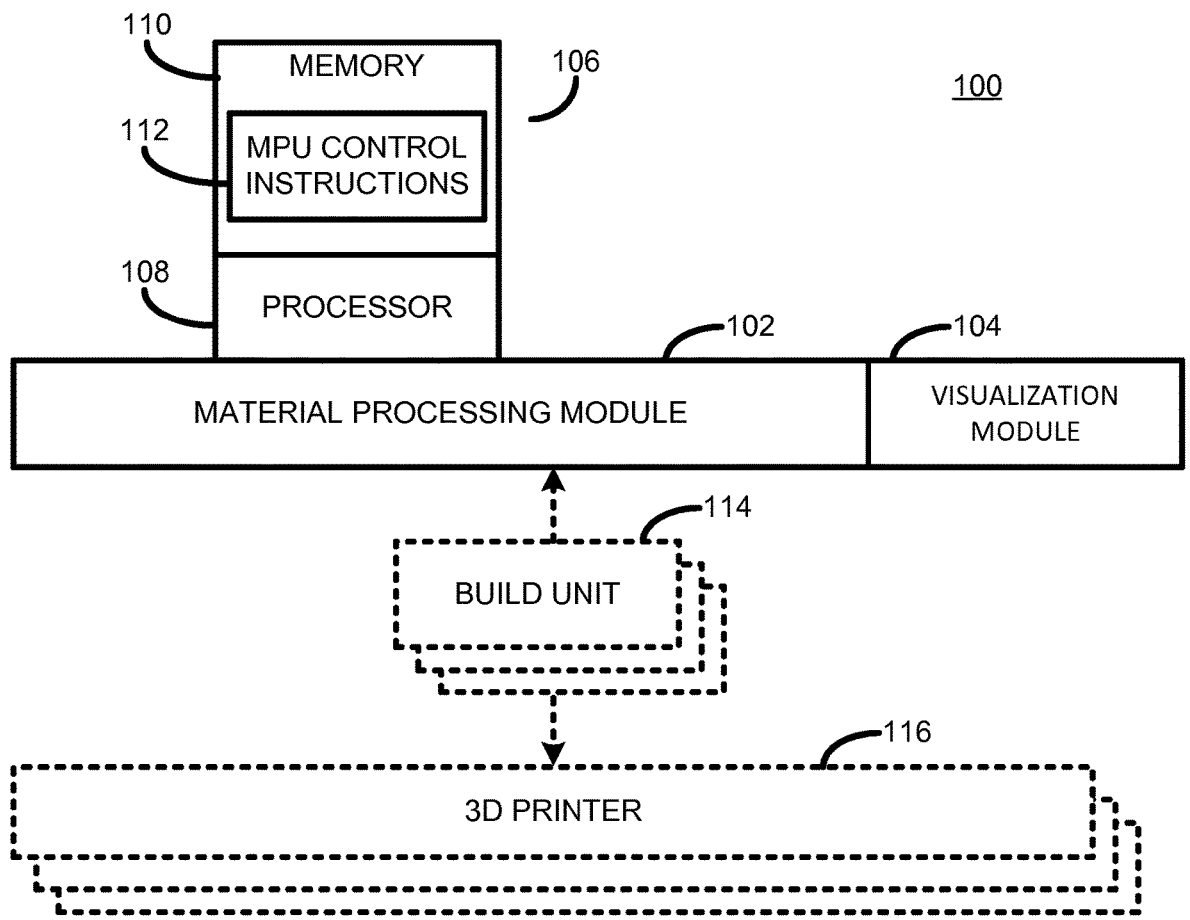
FIG. 1 is a simplified block diagram of a material processing unit according to one example.

Referring now to FIG. 1, a simplified block diagram of a material processing unit 100 is illustrated. The material processing system 100 comprises a material processing module 102. The module 102 may comprise, for example, an unfused build material extraction system, such as a vacuum or pneumatic extraction system, suitable for extracting unfused build material, such as a powdered build material, from a build unit or other suitable build material container. The material processing module 102 may, for example, comprise a vacuum pump, or generator, connectable to a vacuum hose (not shown) which may be used to aspirate unsolidified build material, for example under control from a human operator, from a build unit in which a 3D print job has been performed.

To facilitate removal of generated objects and unsolidified build material the support platform of a build unit being processed in the material processing unit 100 may be slowly raised, for example under control of an operator. This enables an operator to remove unsolidified build material from generated objects, remove the uncovered objects, and then to proceed to remove lower levels of unsolidified build material and other generated objects from the build unit.

The module 102 may also, for example, comprise an unfused build material storage tank (not shown) in which recovered unfused build material may be stored.

The material processing unit 100 also comprises a visualization module 104 which enables a graphical visualization of the contents of a build unit to be displayed to a user, as will be described in greater detail below.

The material processing unit 100 is controlled by a controller 106. The controller 106 comprises a processor 108, such as a microprocessor or microcontroller. The processor 108 is coupled, via a suitable bus (not shown), to a memory 110. The memory 110 stores processor understandable material processing unit control instructions 112 that when executed by the processor 108 controls the material processing unit 100 as described herein.

In one example the visualization module 104 may be implemented by way of visualization module processor understandable instructions stored in the memory 110.

A 3D printing environment may additionally comprise at least one 3D printer, such as a 3D printer 116, shown in dotted lines. The 3D printer 116 may be any suitable powder-based build material 3D printer.

Figure 2:
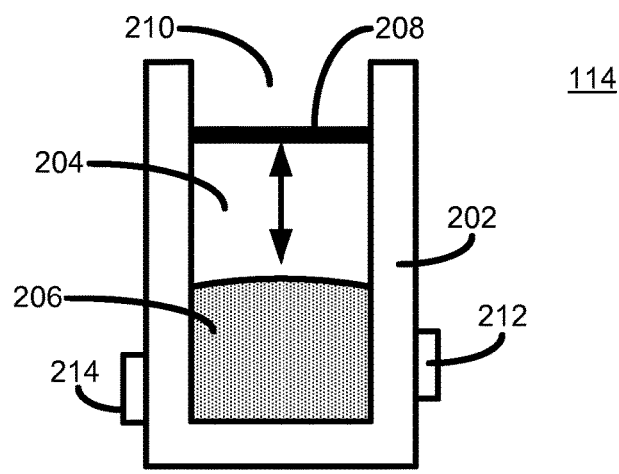
FIG. 2 is a simplified block diagram of a build unit according to one example.

At least one mobile build unit 114 may be used within the printing environment. A simplified illustration of an example build unit 114 is shown in FIG. 2. The build unit 114 comprises an outer housing 202 within which an enclosed build material storage volume 204 is formed by the internal base of the housing 206 and the base of a vertically movable support platform 208. The volume 204 may be used to store build material 206 that is used by a 3D printer to generate 3D objects. Layers of build material may be formed and selectively solidified on the support platform 208 within a build volume 210. As each layer of build material is formed and selectively solidified the support platform 208 may be moved downwards to enable a new layer of build material to be formed and processed. The build unit 114 also comprises a memory 212 to store data related to the build unit 114, as described further below. Although not shown, the build unit 114 may comprise a build material feed mechanism, for instance within the walls of the housing 202, to enable build material 206 to be moved from the volume 204 to enable layers of build material to be formed on the support platform 208. The build unit 114 further comprises an interface 214, such as an electrical interface, to enable a unit to which a build unit is inserted, such as a 3D printer and a material processing unit, to be able to control the height of the support platform 208. The interface 214 may also be used to allow data access to the memory 212.

An empty build unit 114 may be connected to the material processing unit 100 to have a suitable build material loaded thereinto. The build unit 114 may then be inserted into a 3D printer 116 where a print job is performed, causing the generation of a 3D printed object(s) as defined by the print job. After printing, the build unit 114 may be returned to the material processing unit 100 where any unfused build material may be removed, enabling recovery of any 3D printed objects from the build unit 114.

Figure 3:
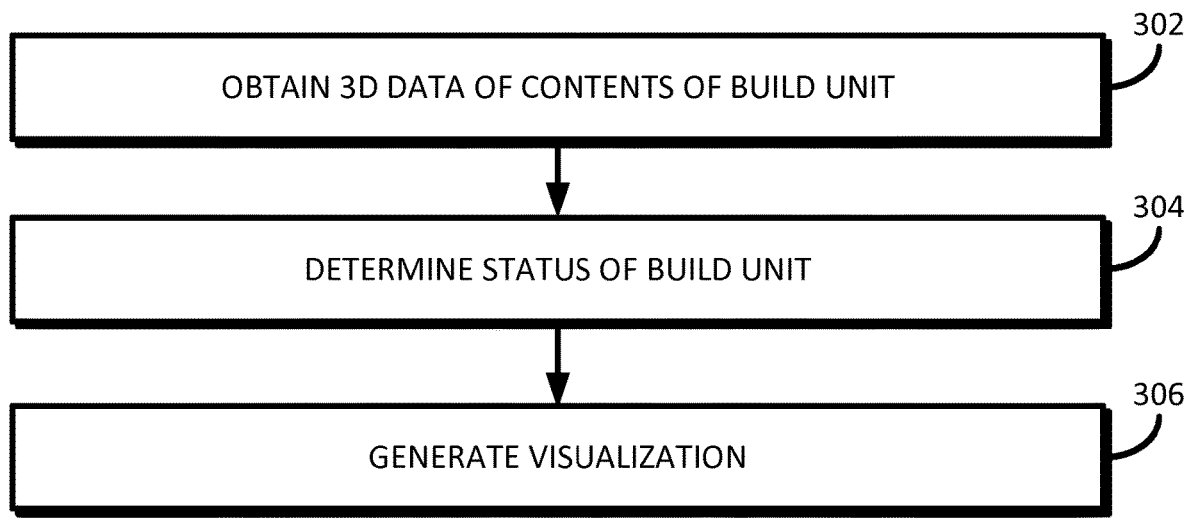
FIG. 3 is a flow diagram outlining an example method of operating a material processing unit according to one example.

An example method of operating the material processing unit 100 to process a build unit in which 3D objects have been generated will now be described, with additional reference to the flow diagram of FIG. 3.

At 302, the processor 108 executes material processing unit control instructions 112 to cause the controller 106 to obtain data representing the contents of a build unit 114 that the material processing unit 100 is to process. In one example the build unit may be inserted into, or otherwise coupled to, the material processing unit 100.

At 304, the controller 106 obtains data representing the contents of the build unit 114 from the memory 212 attached to the build unit 114. In this example, the data representing the contents of the build unit 114 may have been stored in the memory 212 by the 3D printer 116 in which it was processed. In one example the data representing the contents of the build unit 114 may be derived from print job data, although in another example the data representing the contents of the build unit 114 may be print job data.

In another example, the controller 106 obtains data representing the contents of the build unit 114 from a remote data store. The memory 212 of the build unit 114 may store a build unit identifier, and the 3D printer 116 may store in a remote, or networked, data store the identifier of the build unit 114 and associated data representing the contents of the build unit 114. In this way, the controller 106 may obtain the build unit identifier of the build unit 114, and may obtain the data representing the contents of the build unit 114 from the remote data store. In other examples other methods of obtaining the data representing the contents of the build unit 114 may be employed.

The data representing the contents of the build unit 114 may be in any suitable format, such as a 3MF file format, an STL (stereolithography) file format, or similar. The data may be suitable to allow a three-dimensional visual representation, or visualization, on a visual display of the visualization module 104 to be generated. The visualization module 104 may additionally comprise a user interface, such as a touch screen, a virtual reality headset, an augmented reality display, or the like. The visualization module 104 may further comprise a keyboard, a mouse, a joystick, etc. to enable the viewing angle and zoom level to be adjusted, for example to enable a user to rotate the representation of the build volume 302 to enable objects which are hidden from view when viewed from one side to become visible.

At 304, the processor 108 executes material processing unit control instructions 112 to cause the controller 106 to determine the status of the build unit 114. In one example the determined status of the build unit 114 is the height or position within the build unit 114 of the build unit's build platform 208. Knowing the position of the build platform 208 within the build unit 114 allows the distance between the top of the build unit 114 and the build platform 208 to be determined.

As previously mentioned, the height of the build platform of the build unit 114 may be raised whilst the build unit 114 is being processed by the material processing unit 100 to enable objects within the build unit 114 to be extracted from any unsolidified build material.

Figure 4:
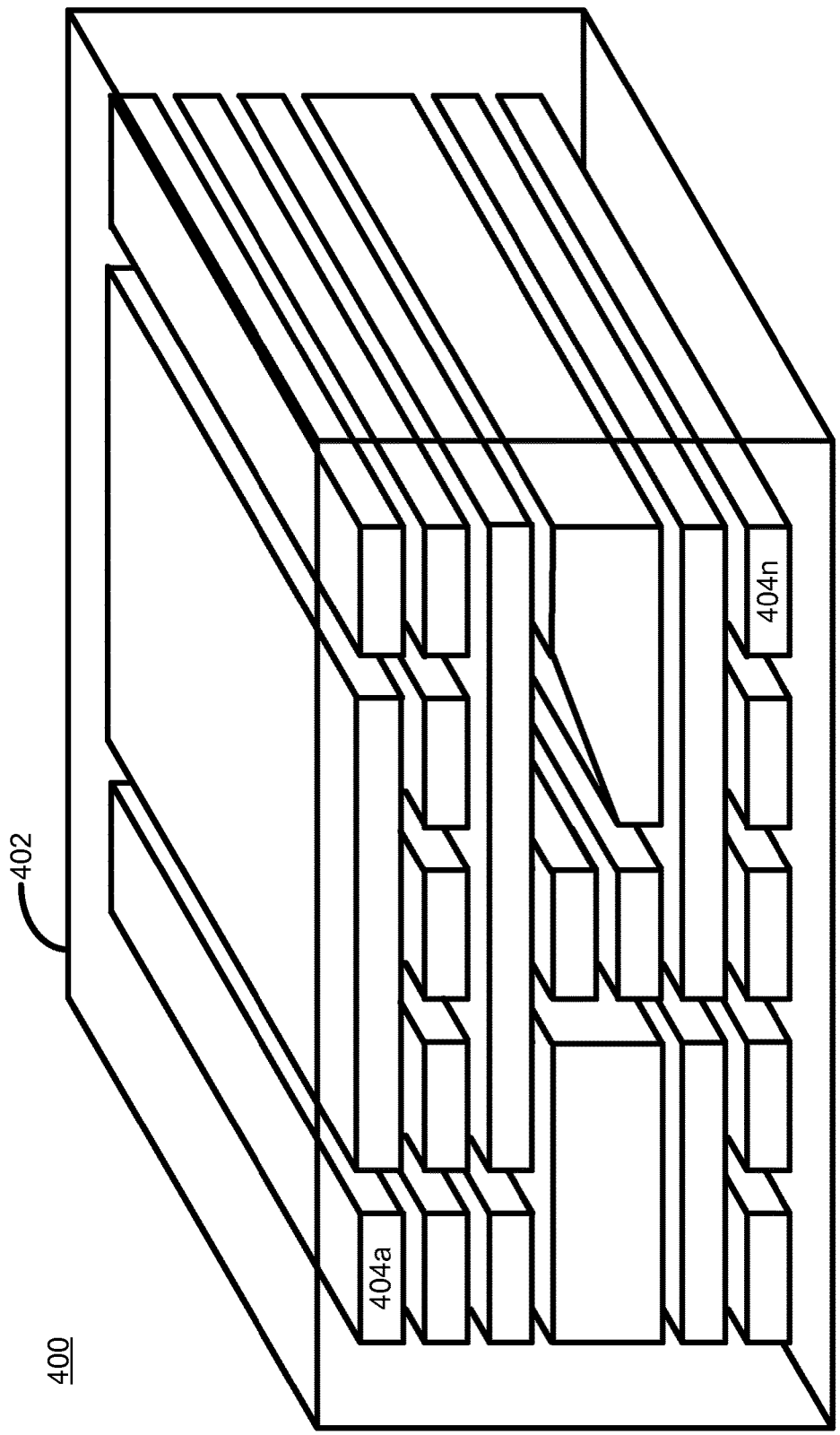
FIG. 4 is an illustration of the contents of a build unit according to one example.

An example representation 400 of the contents of the build unit 114 is illustrated in FIG. 4. The representation 400 is a three-dimensional representation of the objects 404 within the build volume 402, although in other examples a two-dimensional representation could be used. The representation 400 illustrates a build volume 402 that may correspond, for example, to the size and shape of the volume of build material that may be processed within the build unit 114. Within the build volume 402 are illustrated a number of 3D objects 404*a* to 404*n*. The number, size, and shape of the objects 304 may vary.

At 306, the processor 108 executes material processing unit control instructions 112 to control the visualization module 104 to generate a visualization of the contents of the build unit, based on the obtained 3D data and the determined position of the build platform 208.

Figure 5A:
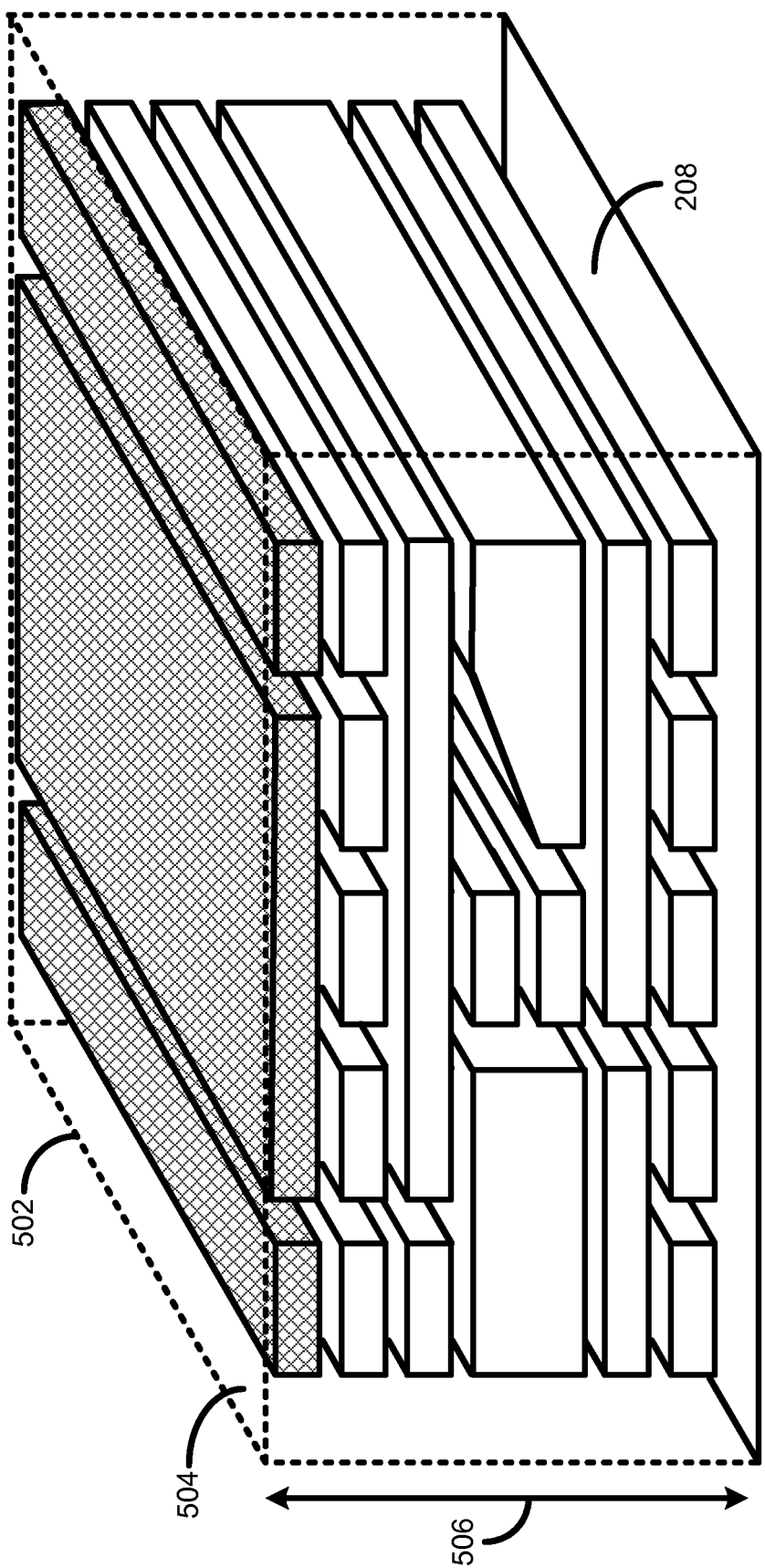
FIGS. 5a and 5b are illustrations of visualizations according to some examples.

An example visualization generated by the visualization module 104 is shown in FIG. 5*a*. The external boundaries of the build volume are shown as dotted lines 502, and within the build volume are shown the objects generated therein. The top of the build unit is shown at 504. The distance between the top of the build unit 504 and the support platform 208 is shown at 506.

In the visualization shown in FIG. 5*a*, any objects within a predetermined distance of the top of the build unit 504 are highlighted, as shown by hatching. This enables an operator manually extracting objects, for example with the assistance of a vacuum hose, to be able to identify the position of those objects within the build unit 114.

Figure 5B:
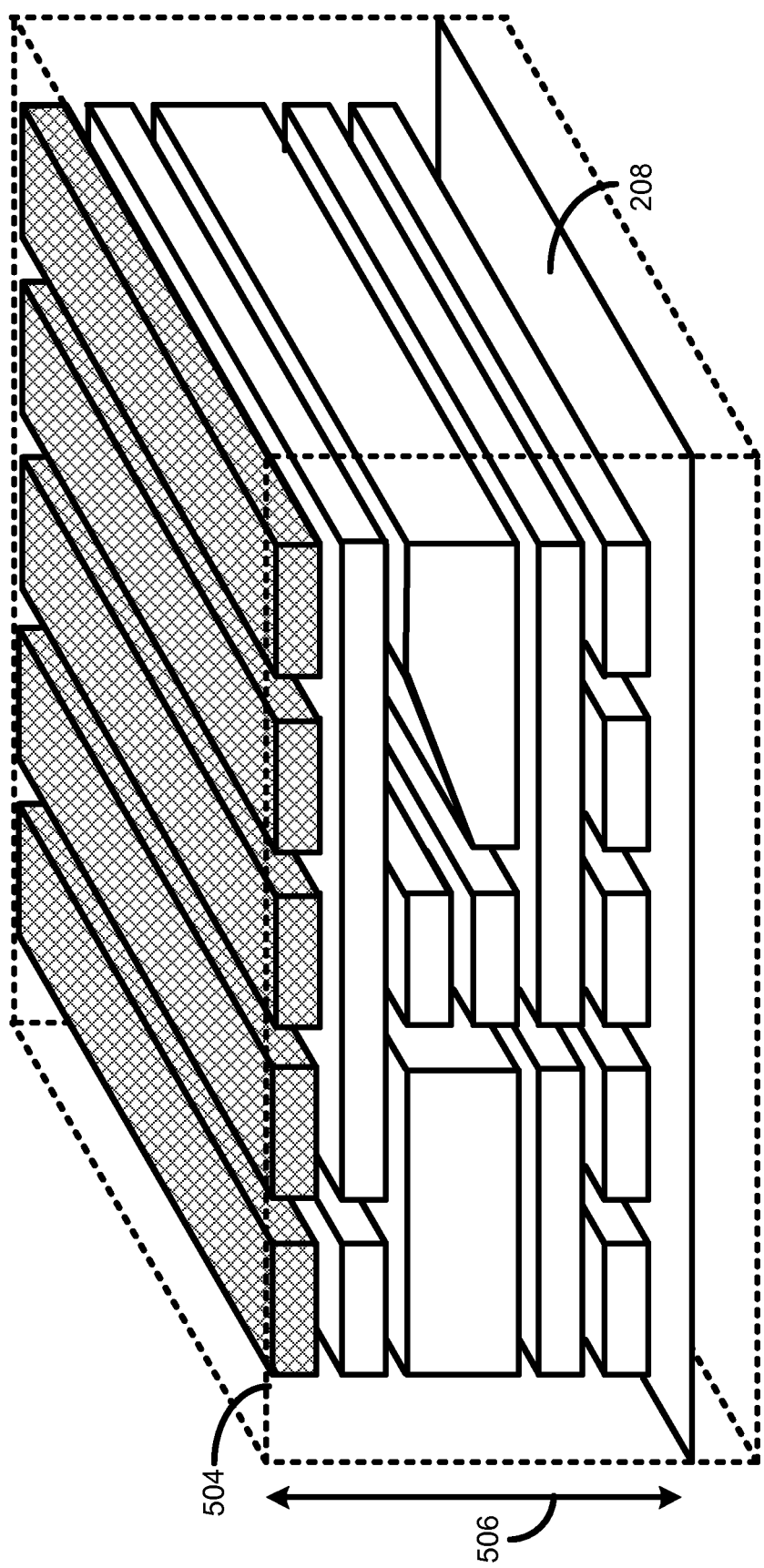

As shown in FIG. 5*b*, as the height of the support platform 208 is raised, so the visualization module 104 updates the generated visualization. In FIG. 5*b* it can be seen that the support platform 208 has been raised, and hence the visualization module 104 has determined those objects which are expected to still be present in the build unit 114. For example, the visualization module 104 assumes that those objects above the top 504 of the build unit 114 have been removed. Again, the visualization module 114 highlights those objects within a predetermined distance from the top 504 of the build unit 114. In one example the predetermined distance may be in the range of about 0 to 2 cm, although in other examples other suitable predetermined distances may be used.

In one example, at least some of the objects 404 may be associated with object metadata. The object metadata may define properties or characteristics of an object. For example, object metadata may define, for example, whether an object is fragile, has a high delivery urgency, is part of a group of other objects, etc. The tag data may also indicate a customer identifier, for example to allow objects within the build unit for the same customer to be easily identified and sorted accordingly. The object metadata may be part of the data representing the contents of the build unit, and may, for example, be extracted from print job data or, be added by a human operator.

Figure 6:
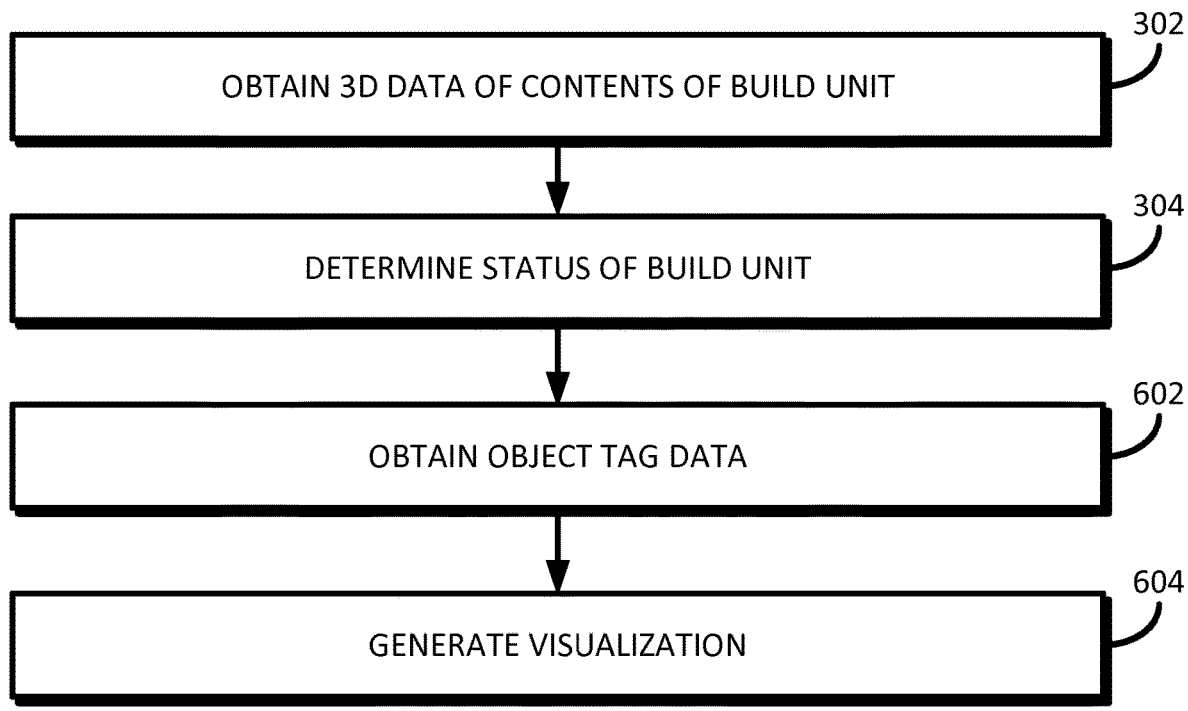
FIG. 6 is a flow diagram outlining an example method of operating a material processing unit according to one example.

A further example is described with reference to the flow diagram of FIG. 6.

As described above, at 302, the processor 108 executes material processing unit control instructions 112 to cause the controller 106 to obtain data representing the contents of a build unit 114 that the material processing unit 100 is to process. At 304, the controller 106 obtains data representing the contents of the build unit 114 from the memory 212 attached to the build unit 114.

At 602, the controller 106 obtains tag data, or metadata, for objects within the build unit 114.

Figure 7:
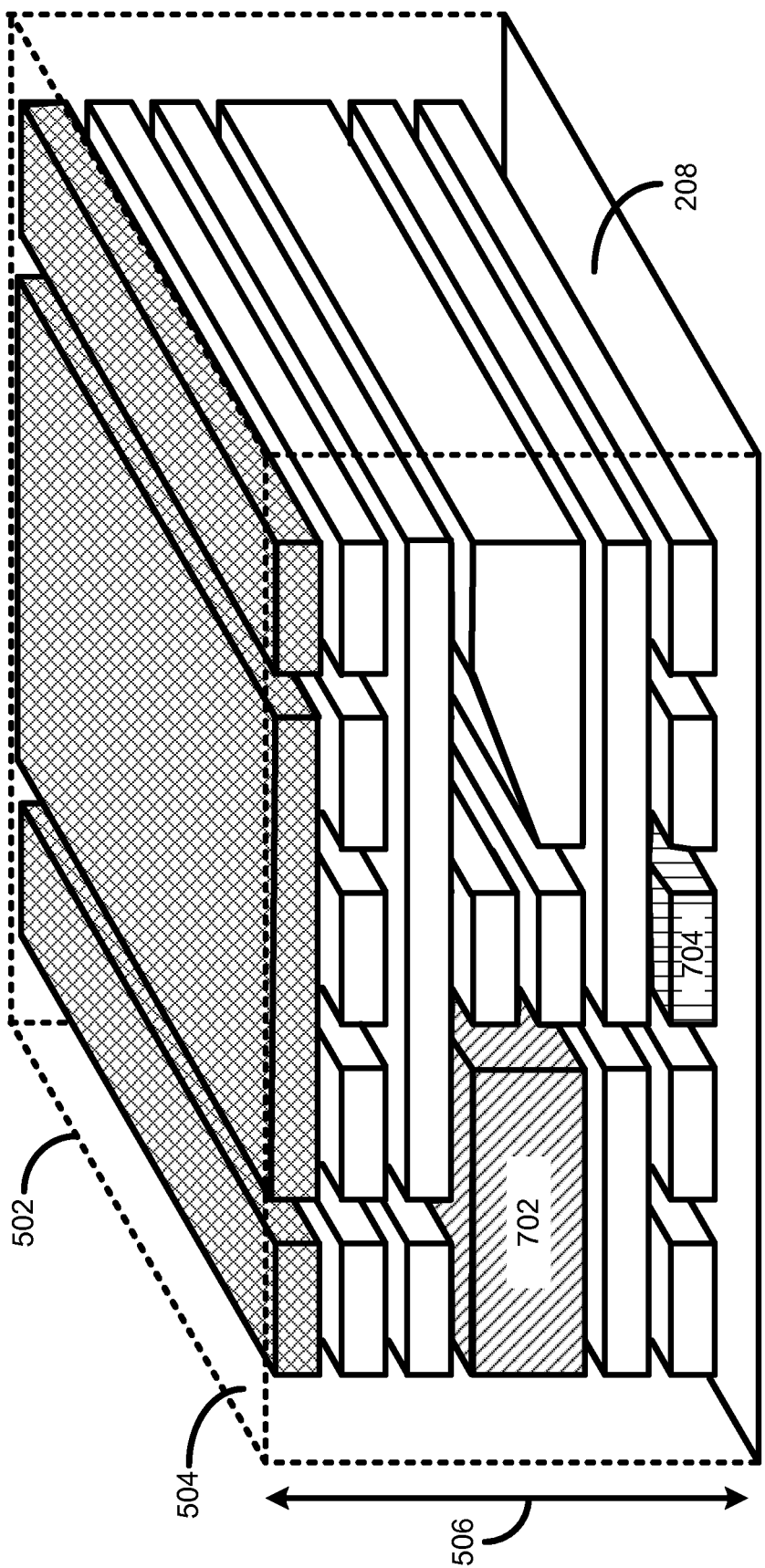
FIG. 7 is an illustration of a visualization according to one example.

At 604, the controller 106 controls the visualization module 104 to generate a visualization of the contents of the build unit, based on the obtained 3D data, the determined position of the build platform 208, and any obtained tag data. An example visualization is shown in FIG. 7. As described above, the visualization highlights any objects within a predetermined distance of the top 504 of the build unit 114. The visualization module 104 may additionally highlight objects based on the obtained tag data. For example an object 702 may be highlighted in one manner to indicate, for example, that the object has an urgent delivery deadline, whereas an object 704 may be highlighted to indicate that it is fragile and may have to be extracted with care. Other tag data may be used to indicate any other suitable properties that may be of use to an operator processing the build unit 114 with the material processing unit 100.

Figure 8:
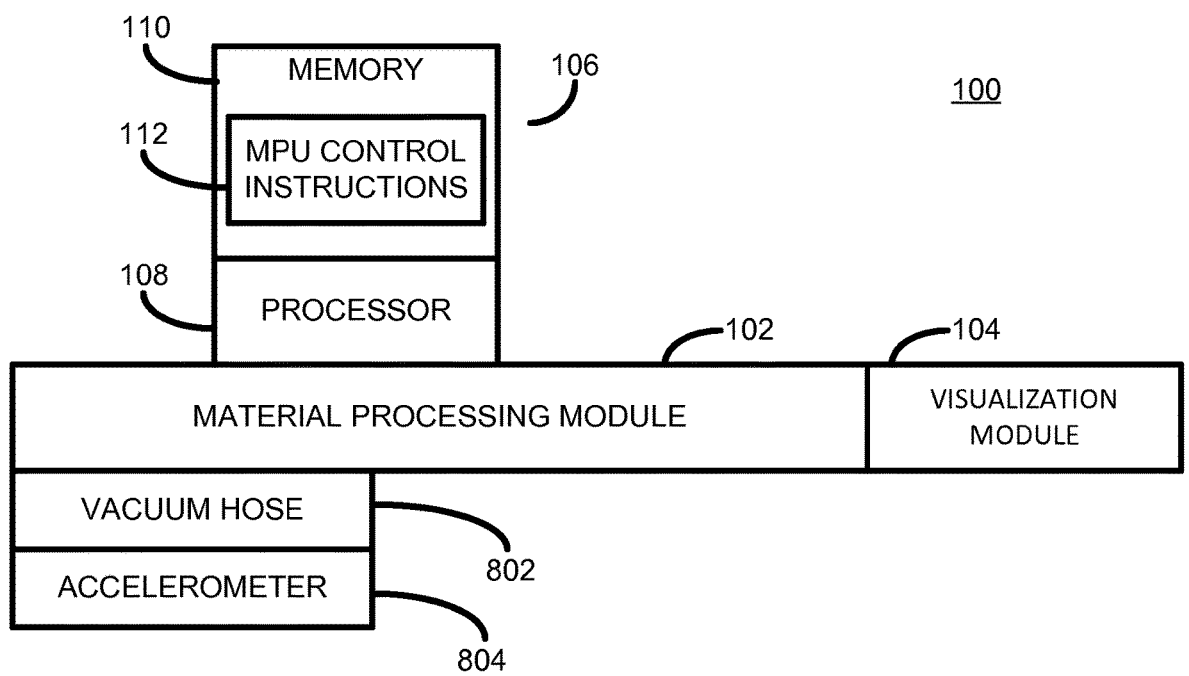
FIG. 8 is a simplified block diagram of a material processing unit according to one example.
Figure 9:
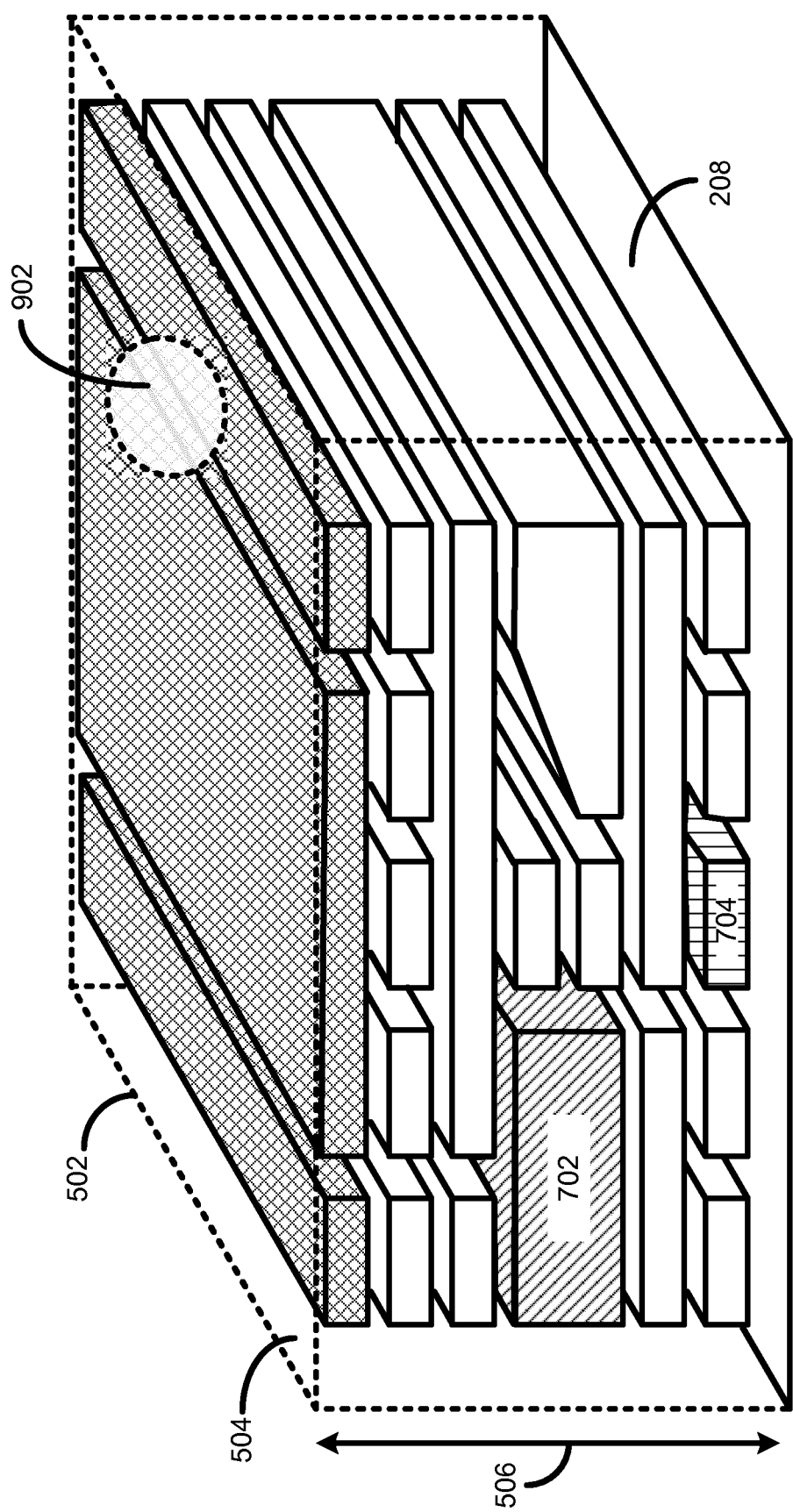
FIG. 9 is an illustration of a visualization according to one example.

In a further example, illustrated in FIG. 8, the material processing unit 100 comprises a vacuum hose 802 to which an accelerometer sensor 804 is connected in proximity to the free end thereof. Data from the accelerometer sensor 804 may be processed by the visualization module 104 to enable the spatial location of the end of the vacuum hose to be determined. The spatial location of the end of the vacuum hose may be used by the visualization module 104 to augment the generated visualization, for example to display on the visualization the determined position of the end of the vacuum hose 802, as illustrated at 902 in FIG. 9. The end of the vacuum hose may, for example, by overlaid on the generated visualization in any suitable manner, for example when its position corresponds to the position of the build unit. The generated visualization may assist an operator in determining the nature of objects in proximity to the end of the vacuum hose, which may be particularly beneficial when the operator is looking to extract specific objects, or particularly small objects.

In a yet further example, the visualization module 104 may generate a visual, audible, or haptic alarm to alert the operator when the determined end of the vacuum hose 802 is within a predetermined distance from an object having a predetermined tag. For example, the visualization module 104 may generate an alarm when the end of the vacuum hose 802 is in proximity to an object tagged as a fragile object. The may allow the operator to exercise additional care when removing unsolidified build material from around the object with the vacuum hose 802.

In a yet further example, the visualization module 104 may modify operating parameters of the material processing unit 100 based on the determined proximity of the end of the vacuum hose to a tagged object. For example, when the visualization module 104 determines that the end of the vacuum hose is approaching an object tagged as fragile, it may control the material processing unit 100 to reduce the air flow of the vacuum, to reduce the speed of any rotating brushes on the end of the vacuum hose 802, etc. In this way, the visualization module may help prevent unintentional damage to fragile objects. Similarly, the visualization module 104 may increase the air flow of the vacuum when the end of the vacuum hose is moved away from objects tagged as fragile.

Although the above described examples describe a three-dimensional representation of the contents of a build unit, other types of visualization may also be generated. For example, the visualization module 104 may display the visualization using two-dimensional images.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A material processing unit, comprising:
a controller programmed to:
obtain data representing the contents of a build unit to be emptied after a print job, the build unit containing and the data describing respective locations within the build unit of an object formed of fused build material and unfused build material surrounding the object;
determine the height of a support platform within the build unit; and
generate a visual representation of the contents of the build unit based on the obtained data and the determined height; and
a display device to present the visual representation of the contents of the build unit at a material processing module where a user removes the unfused build material from the build unit to separate the object formed from unfused build material that is within the build unit, the visual representation to guide the user in extracting the object hidden within the unfused build material.

2. The material processing unit of claim 1, further comprising a memory and interface on the build unit, wherein the controller obtains the data representing the contents of the build unit from the memory on the build unit.

3. The material processing unit of claim 1, wherein the display device comprises a virtual or augmented reality system that uses the visual representation to show the formed object within the build unit based on the height of the support platform.

4. The material processing unit of claim 1, wherein the controller generates a visual representation that highlights generated objects within a predetermined distance from a top of the build unit.

5. A material processing unit, comprising:
a controller programmed to:
obtain data representing the contents of a build unit to be emptied after a print job, the build unit containing and the data describing respective locations within the build unit of an object formed of fused build material and unfused build material surrounding the object;
determine the height of a support platform within the build unit; and
generate a visual representation of the contents of the build unit based on the obtained data and the determined height; and
a display device to present the visual representation of the contents of the build unit at a material processing module where a user removes the unfused build material from the build unit to separate the object formed from unfused build material that is within the build unit, the visual representation to guide the user in extracting the object hidden within the unfused build material;
wherein the controller obtains metadata relating to at least some objects and wherein the controller generates a visual representation that highlights at least some of the objects shown in the visual representation based on the obtained object metadata.

6. A material processing unit, comprising:
a controller programmed to:
obtain data representing the contents of a build unit to be emptied after a print job, the build unit containing and the data describing respective locations within the build unit of an object formed of fused build material and unfused build material surrounding the object;
determine the height of a support platform within the build unit; and
generate a visual representation of the contents of the build unit based on the obtained data and the determined height;
a display device to present the visual representation of the contents of the build unit at a material processing module where a user removes the unfused build material from the build unit to separate the object formed from unfused build material that is within the build unit, the visual representation to guide the user in extracting the object hidden within the unfused build material;
a vacuum generator;
a vacuum hose; and
an accelerometer in proximity to the free end of the vacuum hose.

7. The material processing unit of claim 6, wherein the controller determines, from the accelerometer, the spatial location of the end of the vacuum hose and overlays the position of end of the vacuum hose onto the visual representation.

8. The material processing unit of claim 7, wherein the controller generates an alarm when it determines that the end of the vacuum hose is within a predetermined distance from an object having predetermined associated metadata.

9. The material processing unit of claim 7, wherein the controller adjusts a vacuum force generated by the vacuum generator based on the determined proximity of the end of the vacuum hose to objects having associated metadata.

10. A method in a 3D printing cleaning station comprising a controller programmed to perform the method by:
obtaining data representing the contents of a build unit to be emptied after a print job, the build unit containing and the data describing respective locations within the build unit of an object formed of fused build material and unfused build material surrounding the object;
determining the height of a support platform within the build unit; and
generating a visual representation of the contents of the build unit based on the obtained data and the determined height; and,
with a display device, presenting the visual representation of the contents of the build unit at a material processing module where a user removes the unfused build material from the build unit to separate the object formed from unfused build material that is within the build unit, the visual representation to guide the user in extracting the object hidden within the unfused build material;
wherein the controller obtains metadata relating to at least some objects and wherein the controller generates a visual representation that highlights at least some of the objects shown in the visual representation based on the obtained object metadata.

11. The method of claim 10, wherein obtaining data comprises obtaining data from a memory integrated with the build unit.

12. The method of claim 10, wherein obtaining data comprises obtaining a build unit identifier from a memory associated with the build unit and obtaining data representing the contents of a print job from a remote data store using the obtained build unit identifier.

13. The method of claim 10, further comprising determining the position of an end of a vacuum hose to remove unsolidified build material from the build unit, and generating the visualization based on the determined position.

14. The method of claim 13, further comprising controlling operation of the printing cleaning station based on the determined position of the end of the vacuum hose.

15. The material processing unit of claim 5, wherein the controller is further programmed to highlight an object in the visual representation having a corresponding metadata tag indicating that the object is fragile.

16. The material processing unit of claim 5, wherein the controller is further programmed to highlight an object in the visual representation having a corresponding metadata tag indicating that the object has a high delivery urgency.

17. The material processing unit of claim 5, wherein the controller is further programmed to highlight all objects in the visual representation having a corresponding metadata tag indicating that those object belong to a group or are all for a same customer.

18. The material processing unit of claim 6, wherein the controller is further programmed to generate a haptic alarm when the accelerometer indicates the end of the vacuum hose is within a predetermined distance from an object.

19. The material processing unit of claim 6, wherein the controller is further programmed to reduce a speed of rotating brushes of the end of the vacuum hose when the accelerometer indicates the end of the vacuum hose is within a predetermined distance from an object that is tagged as fragile in the visual representation.

\* \* \* \* \*